3,020,272
DISAZO DYES FOR ACRYLIC AND POLYESTER FIBERS

Mario Francesco Sartori, Wilmington, Del., assignor to E. I. du Pont de Nemours and Company, Wilmington, Del., a corporation of Delaware
No Drawing. Filed May 25, 1959, Ser. No. 815,297
9 Claims. (Cl. 260—186)

This invention relates to novel water-soluble, organic compounds which are useful as dyes for acid-modified acrylic and polyester fibers. By acrylic fiber or acid-modified acrylic fiber, throughout this specification and claims, I mean acrylic fiber having acid sites; for instance, the sulfonate modified acrylic fibers described in U.S.P. 2,837,500 and 2,837,501. By acid-modified polyester fiber, I mean polyethylene terephthalate fiber containing metal-sulfonate groups, as described more fully in Belgian Patent No. 549,179, granted July 14, 1957.

It is an object of this invention to provide novel cationic azo dyes useful for dyeing the aforementioned fibers, but which are particularly characterized by proton stability of shade. By the latter term I mean that the shade of the dyeing on the aforementioned fibers does not change perceptibly with change of H-ion concentration in the acid dye bath employed. Other objects and achievements of this invention will become apparent as the description proceeds.

Water-soluble, cationic azo dyes as a class are not new. In U.S.P. 2,821,526 (issued to Samuel N. Boyd, Jr.) compounds of this general class are set forth which may be expressed by the general formula

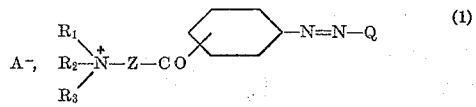
(1)

Full details as to the symbols involved may be found in the patent, but at this point it may suffice to say, by way of summary, that $R_1$, $R_2$ and $R_3$ represent alkyl or substituted alkyl groups; $A^-$ is the anion of a water-soluble acid; the group —Z—CO— represents a short-chain aliphatic acyl radical; the benzene ring shown may contain substituents common in azo dye components, for instance lower alkyl, chlorine, bromine or alkoxy; and that Q is a final component, which is defined in said patent by the group

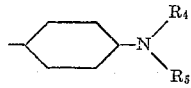

wherein the phenyl nucelus again may contain substituents as are common in azo components, while $R_4$ and $R_5$ may represent hydrogen, lower alkyl, hydroxyalkyl, acetoethyl, cyanoethyl or phenyl.

The said cationic azo compounds have been indicated in said patent as useful for rapid and direct dyeing of acrylic fiber or union fabrics containing such fiber. The dyeings thus obtained were yellow-orange to red-violet in shade and were found there to possess good wash-fastness and light-fastness.

The patent, however, admitted one weakness in said colors, namely: They possess the properties of indicators, and the shade of dyeing obtained with the same compound will generally vary from more (or less) yellow to more (or less) red depending on the hydrogen-ion concentration of the acid dye bath employed. Such variability of the dyeings is generally spoken of as lack of proton stability of shade.

I have now found that hydrolytically stable, water-soluble, cationic, orange azo dyes of excellent proton stability, in addition to having good light-fastness and wash-fastness qualities and other valuable properties, can be obtained if the formula above is expanded into that of a disazo compound, and if the final coupling component Q therein is replaced by the coupling radical of a phenol, for instance, phenol, resorcinol, m-cresol, p-cresol, 2,3-xylenol or halogen substituted phenols.

Accordingly, my present invention contemplates a series of novel compounds of the general formula

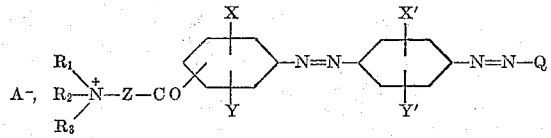

wherein Q is the coupling radical of a phenol which may be further substituted by alkyl radicals of 1 to 4 C-atoms, additional OH groups, chlorine and bromine, X and Y are members of the group consisting of hydrogen, alkyl, chlorine and bromine, X' and Y' are members of the group consisting of hydrogen, alkyl, alkoxy, chlorine and bromine, said alkyl and alkoxy members being radicals of 1 to 4 C-atoms, Z is an alkylene radical having from 1 to 3 C-atoms, $R_1$ is an alkyl radical, $R_2$ is a radical of the group consisting of alkyl and hydroxyalkyl, $R_3$ is a radical of the group consisting of alkyl, hydroxyalkyl and benzyl, said alkyl and hydroxyalkyl members being radicals of 1 to 4 C-atoms, and $A^-$ is a water-solubilizing anion.

My intermediate monoazo compounds may be prepared by the same general procedure as the compounds in said Boyd patent. For instance, a monoazo compound may be prepared by diazotizing in conventional manner a monoquaternary diamine of formula

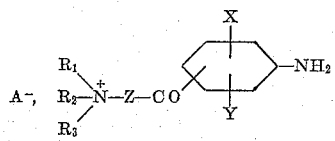

wherein X, Y, Z, $R_1$, $R_2$ and $R_3$ have the same significance as above, while $A^-$ is the anion of a strong mineral acid (such as hydrochloric or sulfuric acid) and coupling, in acid aqueous medium and at a temperature of 5° to 10° C., to a compound of the formula

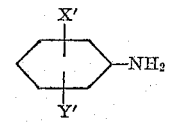

as defined above; the resulting amino azo compound may then be diazotized again and coupled in alkaline medium to a phenol of form Q (as above defined).

The final disazo dye thus produced, which is sparingly soluble in cold water, may be recovered directly by filtration. The requisite initial monoquaternary diamine may be prepared as in Examples IX, XI, XII, XIV(a) and XV(a) of said Boyd patent.

Application of the novel dyes to acrylic or acid-modified polyester fiber may be made from an acid aqueous bath at about pH 4 to 5, at customary dyeing temperatures (180° to 212° F.). Application to union fabrics containing one of the above synthetic fibers and wool is carried out advantageously at 212° F. in a dye bath containing about 2% (by weight of the fiber) of glacial acetic acid, 2% of sodium acetate and 2% of a non-ionic surface active agent, such as Emulphor ON (a condensation product of oleyl alcohol or cetyl alcohol with ethylene oxide). The dyeings thus obtained are bright, fast, hydrolytically stable, shade stable, and they build up to heavy shades on these fibers.

Without limiting this invention, the following examples are given to illustrate my preferred mode of operation. Parts mentioned are by weight.

Example 1

22.8 parts of (p-aminophenacyl)trimethylammonium chloride are diazotized in the usual manner and coupled, at 10° C. and pH 1 to 2, to 10.8 parts of m-toluidine.

The mixture is stirred at 10° C. for 5 hours and then at the ambient temperature for 8 hours, salted with 10% by weight of sodium chloride, and filtered. The orange filter cake is washed with 10% by weight of aqueous sodium chloride solution. The cake is then dissolved in 1000 parts of water and 50 parts of 36% hydrochloric acid by heating at 80° C. The resulting solution is stirred and cooled with ice to 5° to 10° C. and the amine is diazotized by the addition of 6.9 parts of sodium nitrite. An excess of nitrous acid is maintained for 0.5 hour and is then destroyed by the addition of sulfamic acid. The solution is then added during about 30 minutes to a stirred solution of 9.5 parts of phenol in 200 parts of water, containing 4 parts of sodium hydroxide and 40 parts sodium carbonate. During this addition the reaction mixture is maintained at 5° to 10° C. with ice and at pH 8 to 9 by the addition of sodium carbonate. The slurry is stirred for 2 hours at 5° to 10° C., then 16 hours at the ambient temperature. The precipitate is removed by filtration, washed acid-free and dried to give an orange powder. The dye obtained has the formula:

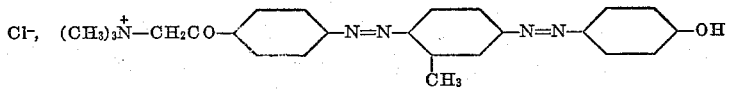

This product dyes acrylic fiber and polyester fiber orange shades of excellent fastness properties.

The shade of the dye does not change with a change in the acidity of the dye bath from pH 3 to pH 7. Without the second diazotization and coupling with phenol the dye applied from a bath at pH 3 is red and at pH 7 is orange.

Example 2

In a manner similar to that of Example 1 orange cationic dyes are prepared by coupling the diazotized monoazo reaction product from diazotized (p-aminophenacyl)trimethylammonium chloride and m-toluidine with each of the following hydroxy coupling components: m-cresol, 2,3-xylenol, 2,6-xylenol. Each of the products dyes acrylic fiber an orange shade of good fastness properties.

Example 3

An aqueous solution of 27 parts of (p-acetamidophenacyl)trimethylammonium chloride in 200 parts of water and 100 parts of 36% aqueous hydrochloric acid is heated at the boil for 0.5 hour to effect hydrolysis of the acetamido group. The resulting solution is stirred, cooled, and diazotized as described in Example 1. The obtained diazo solution is added at 10° C. to a solution of 16.2 parts of 2,5-dichloroaniline in an excess of a 5% hydrochloric acid solution, followed by the addition of sodium acetate to keep the pH at 1 to 2. The mixture is stirred at 10° C. for 5 hours and at the ambient temperature for 8 hours, then filtered and the orange filter cake washed with 10% sodium chloride solution. The cake is dissolved in dilute hydrochloric acid, cooled, diazotized and coupled to 9.5 parts of phenol as described in Example 1. The product dyes acrylic fiber and polyester fiber orange shades of good fastness properties.

Example 4

The replacement in Example 3 of the 2,5-dichloroaniline with 13.2 parts of 5-methyl-o-anisidine gives a product, which dyes acrylic fiber and polyester fiber orange shades of good fastness properties.

This dye has the formula

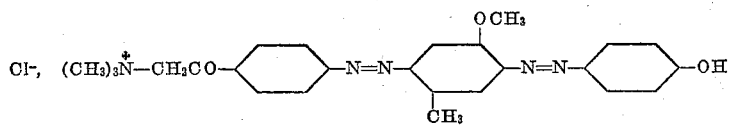

Example 5

In a manner similar to that of Example 1 orange cationic disazo dyes are prepared by coupling the diazotized monoazo reaction product from diazotized (m-aminophenacyl)trimethylammonium chloride and 2,5-dichloroaniline and by coupling the diazotized monoazo reaction product from diazotized (m-aminophenacyl)trimethylammonium chloride and 5-methyl-o-anisidine with the following hydroxy coupling components: m-cresol, 2,3-xylenol, 2,6-xylenol, 2,5-xylenol. Each of the eight compounds dyes acrylic fiber and polyester fiber orange shades of good fastness properties.

Example 6

A solution of 15 parts of (p-acetamidophenacyl)-dimethyl(2-hydroxyethyl)ammonium chloride in 100 parts of water and 50 parts of 36% hydrochloric acid is heated at the boil for 0.5 hour, iced to 0° C. and diazotized by the addition of 3.45 parts of sodium nitrite. An excess of nitrous acid is maintained in the mixture for 0.5 hour and is then destroyed by the addition of sulfamic acid. This solution is added to a stirred solution of 5.4 parts of m-toluidine in an excess of dilute hydrochloric acid at 10° C. The mixture is stirred for 2 hours at 10° C., then 16 hours at the ambient temperature, and then salted with 10% by weight of sodium chloride. The product is isolated by filtering, then washed and dried to give an orange powder. The powder dissolves in water to give an orange solution, which when applied to acrylic fiber imparts an orange shade to the fiber.

For further coupling, this intermediate orange dye is dissolved in 300 parts of water and 25 parts of 36% hydrochloric acid, cooled to 10° C., and diazotized by the addition of 3.45 parts of sodium nitrite. After removal of the excess of nitrous acid, the diazo solution is added during about 0.5 hour to a stirred solution of 5.4 parts of m-cresol in 100 parts of water containing 2 parts of sodium hydroxide and 20 parts of sodium carbonate.

The mixture is stirred 2 hours at 10° C., then 16 hours at the ambient temperature. The precipitate is removed by filtration, washed with water and dried to give an orange powder.

The dye obtained has the formula

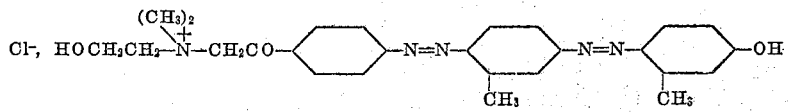

This final product dyes acrylic fiber and polyester fiber orange shades of excellent fastness properties.

Example 7

A solution of 16.5 parts of (p-acetamidophenacyl)-methylbis(2-hydroxyethyl)ammonium chloride in dilute hydrochloric acid is hydrolyzed, diazotized and coupled to m-toluidine as in Example 6. The resulting monoazo dye is diazotized and coupled to m-cresol also as in Example 6.

The dye obtained has the formula

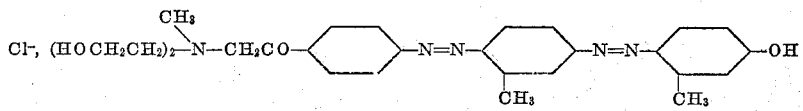

It dyes acrylic fiber and polyester fiber orange shades of very good fastness properties, and the shades do not change with the acidity of the dye bath.

The preparation of the (aminophenacyl)- and the (acetamidophenacyl)trimethylammonium chlorides and the methyl (2-hydroxyethyl)ammonium chlorides used as starting intermediates in the above examples is described in Examples IX and X of U.S.P. 2,821,526.

The novel dyes of this invention may be used in combination with non-ionic dispersing agents and water-soluble diluents to increase the dispersion of the dye for dyeing acrylic and polyester fibers. The type and amount of the dispersing agent and diluent that are effective are illustrated by the following example.

Example 8

One part of an orange cationic disazo dye of the group described in the foregoing examples is mixed by milling with 0.5 part of the condensation product of ethylene oxide and higher aliphatic alcohols ($C_{12}$ to $C_{16}$), 2.5 parts of dextrin, and 40 parts of water. This provides a readily water-dispersible aqueous paste of the dye which more quickly disperses and dissolves than pure unmixed dye. A dispersible dry powder is obtained from the dye paste containing the dispersing agents by evaporating the paste to dryness in a vacuum oven and micropulverizing the dry product.

My novel dyes are applicable to the aforementioned fibers by standard procedure, of which the following two are typical:

(1) *For acrylic fiber.*—100 parts of acrylic fiber as a woven fabric is prescoured at 70° C. for 15 minutes in 4000 parts of water and 1 part of a non-ionic dispersing agent. The fabric is rinsed and then boiled for 2 hours in a dye bath consisting of 1 part of glacial acetic acid, 0.25 part of the dye, 0.3 part of sodium acetate and 4000 parts of water. The fabric is then rinsed in warm water and scoured as before. Finally, the fabric is rinsed, dried and pressed.

(2) *For polyester fiber.*—To 300 parts water, add 0.2 part of the condensation product of 20 moles of ethylene oxide and one mole of oleyl alcohol, 0.6 part of a long-chain hydrocarbon sodium sulfonate and 2 parts of the sodium salt of o-phenylphenol. Add water to adjust the volume to about 390 parts. Adjust the pH to 5.5 by adding 10% acetic acid. Add 0.025 part of dye and 10 parts of polyester staple fiber. Add water to bring the dye bath volume to 400 parts, heat the dye bath to the boil and boil for 2 hours. Then rinse the fiber in water, scour it by heating for 30 minutes at 80° C. in an aqueous bath containing 0.5 gram per liter each of the following: NaOH, cetyl betaine and sodium hydrosulfite. Again rinse the fiber in water and dry it. Then heat-treat this dyed fiber for 1 minute at 190° C.

It will be understood that the details of the above examples can be varied widely without departing from the spirit of this invention. For instance, the examples utilize the chloride salts of the cationic dyes, but the anion in the dye is not critical so long as it renders the dye partially soluble in water. Other anions may have their origin in other phenacyl derivatives such as p-aminophenacyl bromide which reacts with a tertiary amine to form the quaternary phenacylammonium bromide. Other anions may arise by subjecting the phenacylammonium chloride or the dyes prepared from them to the usual metathetical reactions. For instance, hydrolysis of the (p-acetamidophenacyl)trimethylammonium chloride as described in Example 3 may be done with 5 to 10 parts of 4 N sulfuric or phosphoric acid in place of the hydrochloric acid. The resulting solutions of the (p-aminophenacyl)-trimethylammonium sulfates or phosphates can be treated directly with sodium nitrite to effect diazotization of the primary aromatic amines.

The phenacyl intermediates named in the examples may be coupled to other first components within the general formula above set forth, and in lieu of the named phenacyl intermediates themselves any of the following may be used:

(3' - amino - 4' - methylphenacyl)trimethylammonium chloride,
(4'-amino-3' - chlorophenacyl)dimethylbenzylammonium sulfate,
(4'-amino-2',5' - dimethylphenacyl)dimethyl(2 - hydroxyethyl)ammonium phosphate,
(4'-amino - 3',5' - dibromophenacyl)trimethylammonium chloride,
[2-(p-aminobenzoyl)ethyl]trimethylammonium chloride,
[3-(p-aminobenzoyl)propyl]triethylammonium bromide, or
(4' - amino - 2 - methylphenacyl)trimethylammonium chloride.

For the final component Q, other advantageous hydroxy compounds may be used to provide the orange cationic dyes; for instance, 3,5-xylenol and resorcinol. Ortho and p-cresol can be used in place of m-cresol, but the shades of the resulting dyes are weaker than those of dyes made with m-cresol. The same is true of dyes made with 2,4- and 3,4-xylenols in place of the 2,3-, 2,5-, and 2,6-xylenols cited in the examples.

Many other variations in detail will be readily apparent to those skilled in the art.

The advantages of this invention will now be readily apparent. My novel compounds possess a combination of useful properties, including water-solubility, hydrolytic and proton stability, good build-up, good brightness, carbonization fastness and remarkable light-fastness properties.

Hydrolytic stability implies that the dye is not decomposed by water, whether in acid, neutral or alkaline bath.

The significance of carbonization fastness will become apparent from the following mode of testing for the same. The test is applied to a union fabric comprising wool and acyrlic or acid-modified polyester fiber, and consists essentially of a hot treatment of the fabric with sulfuric acid of about 3% concentration for the purpose of removing extraneous matter from the wool. The wool in the mixed goods is first dyed with a so-called neutral dyeing color such as a 1:2 metallized azo dye. Then the mixed goods are dyed with a cationic dye (for instance the novel compounds of this application), to color the acid-modified polyester or acrylic fiber present. If the cationic dye has poor proton stability, its true shade is altered considerably as a result of the low pH reached in the subsequent carbonization treatment. Some cationic dyes recover their true shade upon neutralization of the carbonized and dyed fabric. Others are poor in their shade recovery. Shade stability or sensitivity to the acid before neutralization is also important. The dyes of this invention pass both tests quite well, i.e., there is no shade change in dye baths at low pH, and the very small shift in shade caused by the carbonization treatment is completely recovered in the neutralization step.

In the claims below the expressions lower alkyl, lower alkoxy, and lower hydroxyalkyl shall be understood as referring to radicals having not more than 4 C-atoms.

I claim as my invention:

1. A compound of the formula

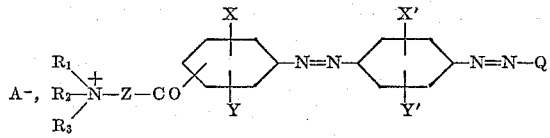

wherein Q is the coupling radical of a mononuclear phenol which is free of substituents other than chlorine, bromine, lower alkyl and additional hydroxy groups and which is attached to its N=N group in a position para to an OH group, X and Y are members of the group consisting of hydrogen, lower alkyl, chlorine and bromine, X' and Y' are members of the group consisting of hydrogen, lower alkyl, lower alkoxy, chlorine and bromine, Z is an alkylene radical having from 1 to 3 C-atoms, $R_1$ is a lower alkyl radical, $R_2$ is a radical of the group consisting of lower alkyl and lower hydroxyalkyl, $R_3$ is a radical of the group consisting of lower alkyl, lower hydroxyalkyl and benzyl, and $A^-$ is a water-solubilizing anion.

2. A compound as in claim 1, Q being the coupling radical of phenol.

3. A compound as in claim 1, Q being the coupling radical of m-cresol.

4. A compound as in claim 1, Q being the coupling radical of 2,3-xylenol.

5. A compound as in claim 1, Q being the coupling radical of 2,6-xylenol.

6. A compound of the formula

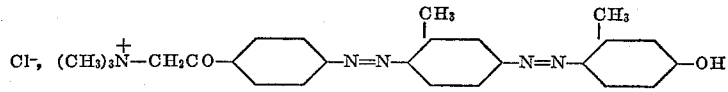

7. A compound of the formula

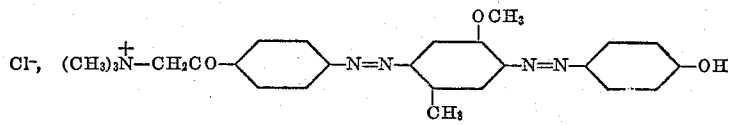

8. A compound of the formula

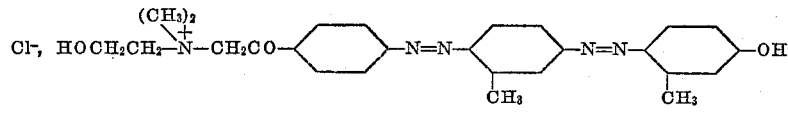

9. A compound of the formula

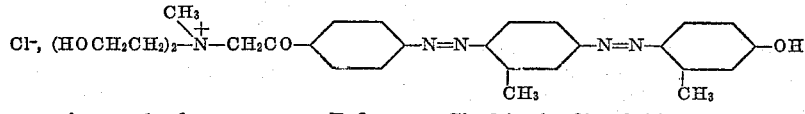

References Cited in the file of this patent

UNITED STATES PATENTS

| Re. 11,714 | Konig | Jan. 31, 1899 |
| 2,764,466 | Bidgood | Sept. 25, 1956 |
| 2,772,943 | Hiller | Dec. 4, 1956 |
| 2,821,526 | Boyd | Jan. 28, 1958 |
| 2,832,764 | Huenig | Apr. 29, 1958 |
| 2,864,812 | Bossard | Dec. 16, 1958 |
| 2,913,303 | Baumann | Nov. 17, 1959 |

FOREIGN PATENTS

| 776,268 | Great Britain | June 5, 1957 |

OTHER REFERENCES

Colour Index, Second Edition, 1956, Society of Dyers and Colourists, vol. 1, p. 1623, entry C.I. 11270.

Ibid., vol. 3, p. 3018, entry C.I. 11270.